(12) United States Patent
Kamar

(10) Patent No.: US 12,498,951 B2
(45) Date of Patent: Dec. 16, 2025

(54) DIRECT MODE FOR VIRTUALIZATION

(71) Applicant: Google LLC, Mountain View, CA (US)

(72) Inventor: Abdulla Ahmad Kamar, Sydney (AU)

(73) Assignee: Google LLC, Mountain View, CA (US)

( * ) Notice: Subject to any disclaimer, the term of this patent is extended or adjusted under 35 U.S.C. 154(b) by 548 days.

(21) Appl. No.: 17/826,307

(22) Filed: May 27, 2022

(65) Prior Publication Data

US 2023/0409365 A1    Dec. 21, 2023

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45579* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,590,982 B1 * | 9/2009 | Weissman | G06F 9/4812 |
| | | | 710/262 |
| 9,672,052 B1 | 6/2017 | Berreth et al. | |
| 9,959,224 B1 | 5/2018 | Serebrin | |
| 10,798,022 B2 | 10/2020 | Balan et al. | |
| 11,288,301 B2 | 3/2022 | Lippsett et al. | |
| 2007/0006218 A1 * | 1/2007 | Vinberg | G06F 9/45558 |
| | | | 717/174 |
| 2008/0133896 A1 * | 6/2008 | Keniston | G06F 11/3644 |
| | | | 712/E9.016 |
| 2008/0256564 A1 * | 10/2008 | Fathalla | G06F 9/45537 |
| | | | 719/331 |
| 2010/0138831 A1 * | 6/2010 | Inoue | G06F 9/45558 |
| | | | 718/1 |
| 2011/0321158 A1 * | 12/2011 | Craddock | G06F 9/468 |
| | | | 726/20 |
| 2012/0033673 A1 * | 2/2012 | Goel | G06F 9/5077 |
| | | | 370/400 |

(Continued)

FOREIGN PATENT DOCUMENTS

| | | | | |
|---|---|---|---|---|
| CN | 106201646 B | * | 7/2015 | ............. G06F 9/544 |
| WO | WO-2012152326 A1 | * | 11/2012 | ........... G06F 9/5027 |

(Continued)

*Primary Examiner* — Charles E Anya
(74) *Attorney, Agent, or Firm* — Botos Churchill IP Law

(57) ABSTRACT

A direct mode is provided for virtualization to enable simultaneous operation of different operating systems. A compatibility layer operates as a translator between instructions for the kernel of the host operating system running on device hardware and a guest operating system running in a virtual machine. A single layer of scheduling is employed via a host scheduler to support more optimal scheduling for the guest code. This approach supports running unmodified applications for the guest OS in the virtual machine. Memory management streamlines file write operations in which write operation parameters are mapped directly between one or more threads and virtual processors executing them. The direct mode for virtualization also enables streamlining message passing. It can also enable enhanced security between processes from different operating systems.

24 Claims, 15 Drawing Sheets

(56) References Cited

U.S. PATENT DOCUMENTS

| | | | |
|---|---|---|---|
| 2012/0296626 A1* | 11/2012 | Bond | G06F 9/4552 |
| | | | 703/26 |
| 2013/0227549 A1* | 8/2013 | Accapadi | G06F 9/45558 |
| | | | 718/1 |
| 2014/0173628 A1* | 6/2014 | Ramakrishnan Nair | |
| | | | G06F 9/45533 |
| | | | 718/108 |
| 2016/0147556 A1* | 5/2016 | Hu | G06F 9/45558 |
| | | | 718/1 |
| 2018/0181451 A1 | 6/2018 | Saxena et al. | |
| 2019/0005241 A1* | 1/2019 | Boutnaru | G06F 21/554 |
| 2021/0224089 A1* | 7/2021 | Laplace | G06F 9/45558 |
| 2021/0294900 A1 | 9/2021 | Mooring et al. | |
| 2021/0303324 A1* | 9/2021 | Tsirkin | G06F 9/5027 |
| 2021/0390182 A1* | 12/2021 | Boutnaru | G06F 21/568 |
| 2022/0083362 A1* | 3/2022 | Dale | G06F 9/45512 |
| 2022/0222337 A1* | 7/2022 | Doshi | G06F 21/53 |
| 2023/0195484 A1* | 6/2023 | Warkentin | G06F 9/45558 |
| | | | 718/1 |

FOREIGN PATENT DOCUMENTS

| | | | | |
|---|---|---|---|---|
| WO | WO-2015088374 A1 * | 6/2015 | | G06F 9/45516 |
| WO | WO-2017103651 A1 * | 6/2017 | | G06F 12/145 |

* cited by examiner

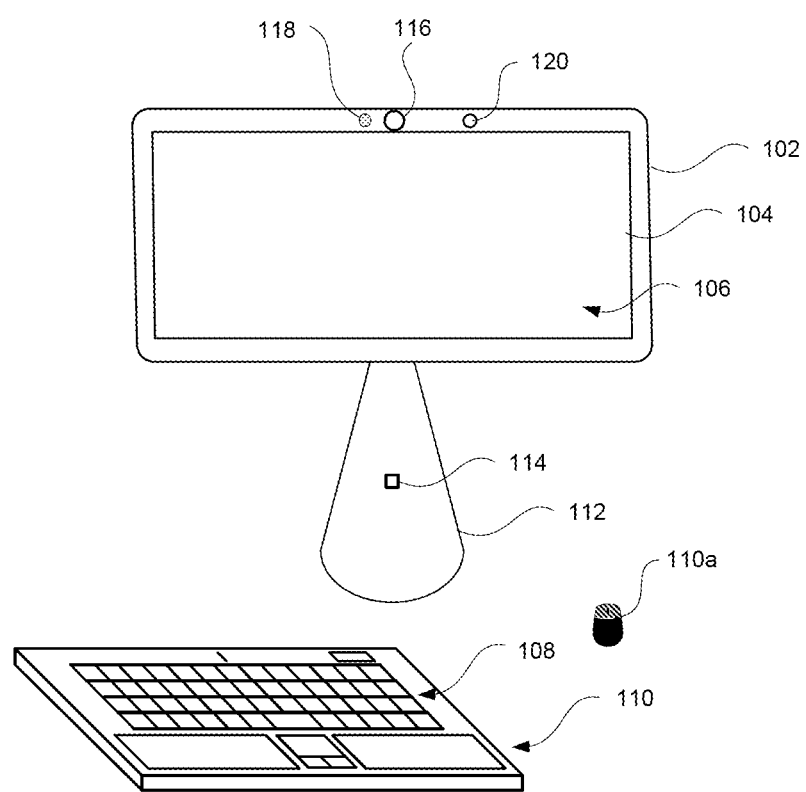

140

160

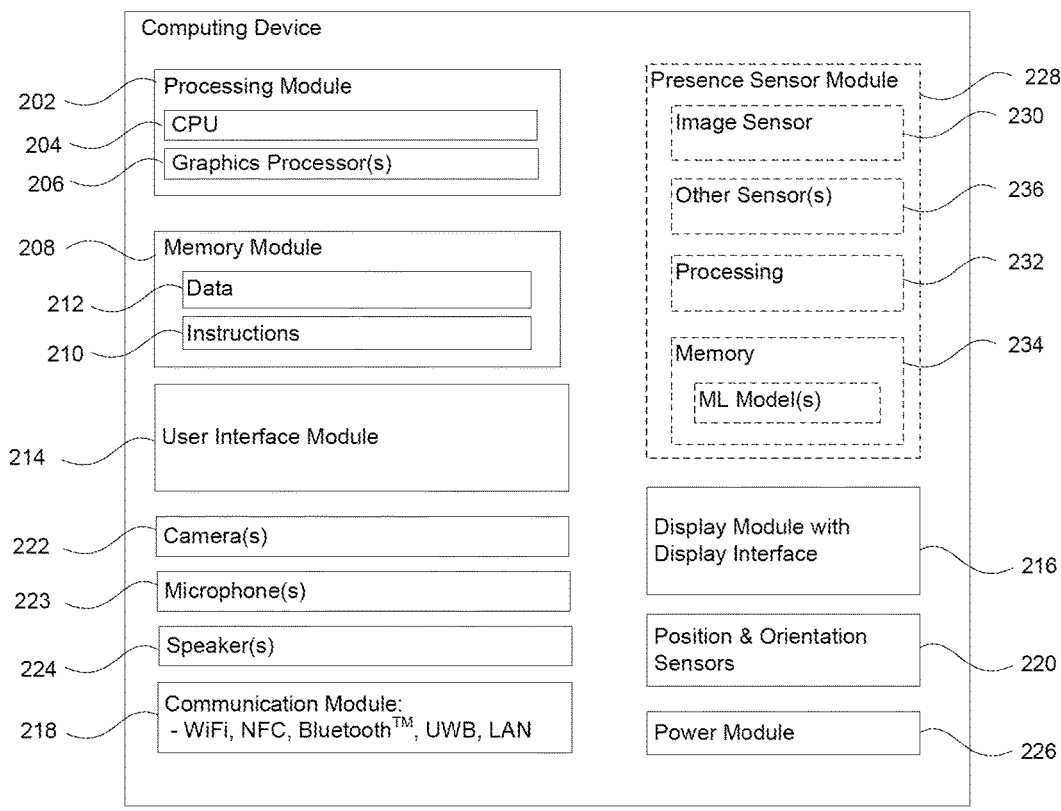

300

400

420

500

520

540

600

620

640

700

800

820

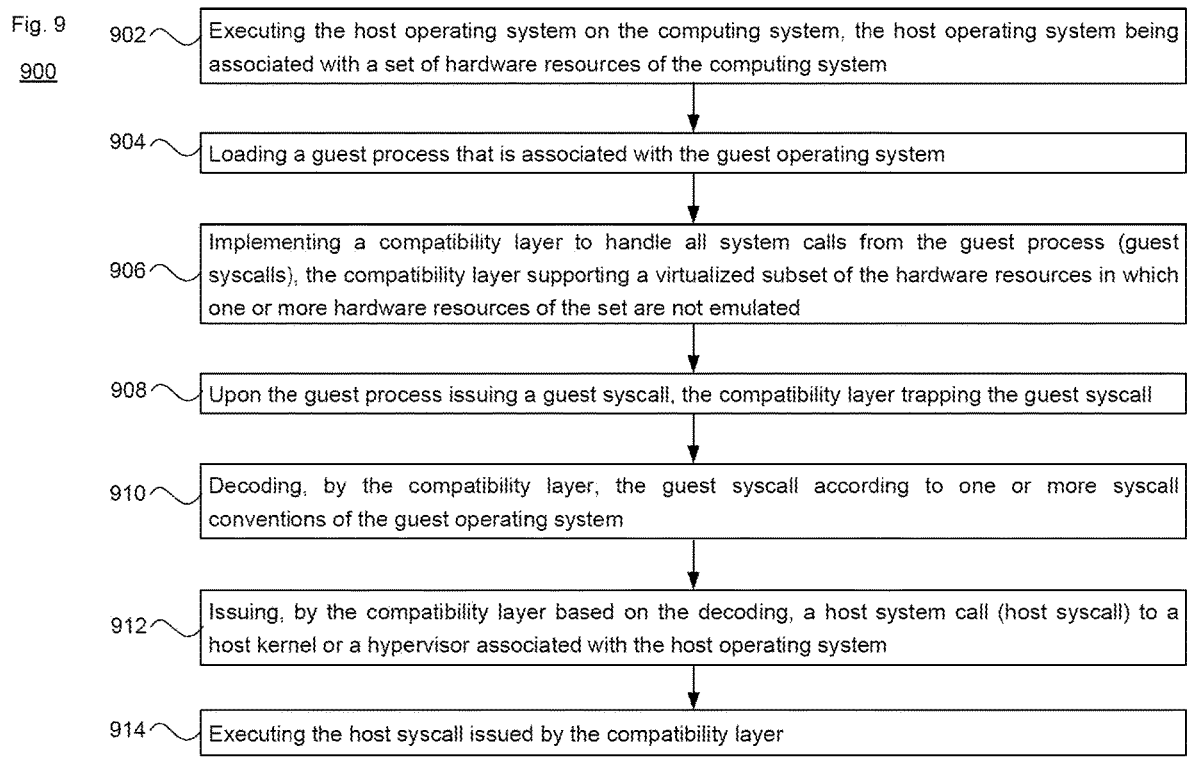

DIRECT MODE FOR VIRTUALIZATION

BACKGROUND

Computer systems, whether they be stand-alone devices such as desktop or laptop computers, or larger-scale systems such as cloud-based arrangements that employ one or more groups of servers, execute computer programs within an operating system environment. The operating system is designed to process the program instructions of different programs and manage access to the hardware resources of the computer system. Virtualization may be employed to enable the execution of different computer program instances in different isolated virtual machines. Virtual machines emulate at least some of the hardware resources of the computer system.

The virtualization approach allows for a user to have different operating systems running on a single device. Here, while an additional operating system would function as though it is running directly on the device's hardware, that operating system is actually running via emulation of the corresponding virtual machine. These virtual machines are known as "guests", which can be managed by a supervising process, known as a "hypervisor". The hypervisor creates virtualization layers that separate the hardware resources (e.g., processing resources, memory, etc.) from the virtual machines. In this way, each virtual machine is isolated from the others, so that each instance of a particular computer program executing within a corresponding virtual machine is completely isolated from other instances of that program. However, a technical problem with having a number of different operating systems executing within their corresponding virtual machines in a single computing system is that this may result in significant resources of the computing system being consumed or dedicated to those virtual machines. This can adversely affect the overall performance of the computing system, including memory and other resource conflicts, audio glitches, display artifacts, etc. In addition, in many instances virtualization is used to run one operating system inside another. This leads to another technical problem involving conflicts in resource management between the operating systems, such as two levels of process scheduling, and two levels of memory management, which make it hard to accurately manage hardware resources within either the guest or host.

BRIEF SUMMARY

Aspects of the technology provide efficient virtualization without adding additional complexity to the kernel of the primary operating system that is actually running on the hardware of the computing system. In particular, a compatibility layer is created that acts as a translator between the message passing kernel of the primary operating system and the kernel of a guest operating system, so that applications of the guest operating system can run without modification. More particularly, the compatibility layer acts as a translation layer of the guest operating system's API (syscalls) to the primary (host) operating system's API (syscalls). The compatibility layer intercepts the guest operating system's syscalls and appears to be the kernel for the guest operating system. However, while the compatibility layer translates those calls, it does not function as a full-blown kernel. It can handle any errors and act as a debugger. The compatibility layer also enables access to kernel syscalls from the guest operating system. According to one aspect, during a file write process, zero additional copy operations are required, which minimizes the performance impact on the computing system. The technical solution is a direct mode where virtualization supports a minimum amount of hardware resources that are sufficient for the compatibility layer to manage the syscalls from the guest operating system. The technology can be employed with different hardware architectures, such as x86 architectures that use complex instruction set computing (CISC) and ARM architectures that use reduced instruction set computing (RISC). Thus, this approach can have the benefits of efficient message passing and thread management, reduced memory usage by zero copy operations and enhanced security between processes from different operating systems.

According to one aspect, a method is provided for implementing a virtualization mode on a computing system having a host operating system and a guest operating system. The method comprises: executing the host operating system on the computing system, the host operating system being associated with a set of hardware resources of the computing system; loading a guest process that is associated with the guest operating system; implementing a compatibility layer to handle all system calls from the guest process (guest syscalls), the compatibility layer supporting a virtualized subset of the hardware resources in which one or more hardware resources of the set are not emulated; upon the guest process issuing a guest syscall, the compatibility layer trapping the guest syscall; decoding, by the compatibility layer, the guest syscall according to one or more syscall conventions of the guest operating system; issuing, by the compatibility layer based on the decoding, a host system call (host syscall) to a host kernel or a hypervisor associated with the host operating system; and executing the host syscall issued by the compatibility layer.

In one example, the method further comprises manipulating, by the compatibility layer, address space of the guest process to change an address of a program break of the guest process. Alternatively or additionally, the method may further comprise modifying a parameter of the guest process to enable any number of virtual processors with the virtualization mode. Alternatively or additionally, implementing the compatibility layer may include creating a direct mapping between tasks of the guest process and a set of virtual processors. In any of these instances, the virtualized subset of the hardware resources may not include at least one of: interrupt controller emulation, para-virtual clock emulation, saving and restoring of system registers, or handling of system instructions that are only required for full operating system support. Alternatively or additionally, any timers associated with the guest process are handled by the host operating system.

In one scenario, the computing system has an ARM-based architecture. Here, the guest process issues the guest syscall at exception level 0 (EL0) and the method includes trapping the guest syscall by the compatibility layer occurs at exception level 1 (EL1), and issuing the host syscall call by the compatibility layer comprises issuing a hypervisor call to the hypervisor. This approach may further comprise creating a virtual dynamic shared object (VDSO) for mapping into a guest EL1 for the compatibility layer. Here, executing the hypervisor call issued by the compatibility layer may include: trapping, by the hypervisor, the hypervisor call; validating that a guest instruction pointer is from within the VDSO; and validating that the hypervisor call was made from the guest ELL In this case, the method may further comprise, upon validating that the hypervisor call was made from the guest EL, the hypervisor making function calls associated with the hypervisor call within the host kernel.

In another scenario, the computing system has an x86-based architecture. Here, the guest process issues the guest syscall at virtual machine extension (VMX) Ring 3 and the method includes trapping the guest syscall by the compatibility layer occurs at VMX Ring 0, and issuing the host syscall by the compatibility layer comprises issuing a host kernel system call at VMX Ring 0.

In one example for any of the above, the virtualization mode does not support interrupt injection into the guest process. Alternatively or additionally, the guest process may correspond to a memory management operation. Here, the memory management operation may include a file write operation in which parameters associated with the write operation are mapped directly.

According to another aspect, a computing system is provided having a host operating system and supporting a guest operating system in a virtualization mode. The computing system comprises a processing module having one or more hardware processors and memory include a kernel space and a user space in which the memory stores the guest operating system in the user space. The processing module is configured to implement the virtualization mode by: execution of the host operating system, the host operating system being associated with a set of hardware resources of the computing system; load a guest process that is associated with the guest operating system; implement a compatibility layer to handle all system calls from the guest process (guest syscalls), the compatibility layer supporting a virtualized subset of the hardware resources in which one or more hardware resources of the set are not emulated; upon the guest process issuing a guest syscall, having the compatibility layer trap the guest syscall; decode, by the compatibility layer, the guest syscall according to one or more syscall conventions of the guest operating system; issue, by the compatibility layer based on the decoding, a host system call (host syscall) to a host kernel or a hypervisor associated with the host operating system; and execute the host syscall issued by the compatibility layer.

The compatibility layer may be further configured to manipulate address space of the guest process to change an address of a program break of the guest process. Alternatively or additionally, the processing module is further configured to modify a guest class to remove any limit on a virtual-processor identifier (VPID) allocator. Alternatively or additionally, implementation of the compatibility layer includes creating a 1:1 (direct) mapping between guest threads and virtual central processing units (VCPUs). Alternatively or additionally, the one or more hardware resources of the set that are not emulated includes at least one of a peripheral component interconnect bus, a universal asynchronous receiver-transmitter, a real-time clock, a storage device, a network device, or a graphics device.

In one scenario, the computing system has an ARM-based architecture. Here, the guest process issues the guest syscall at exception level 0 (EL0), the guest syscall is trapped by the compatibility layer at exception level 1 (EL1), and issuance of the host syscall by the compatibility layer comprises issuance of a hypervisor call to the hypervisor. In this case, the processing module may be further configured to create a virtual dynamic shared object (VDSO) for mapping into a guest EL1 for the compatibility layer. Execution of the hypervisor call issued by the compatibility layer may include: trapping, by the hypervisor, the hypervisor call; validation that a guest instruction pointer is from within the VDSO; validation that the hypervisor call was made from the guest EL1; and upon validation that the hypervisor call was made from the guest EL, the hypervisor makes function calls associated with the hypervisor call within the host kernel.

In another scenario, the computing system has an x86-based architecture. Here, the guest process issues the guest syscall at virtual machine extension (VMX) Ring 3, the guest syscall is trapped by the compatibility layer at VMX Ring 0, and issuance of the host syscall by the compatibility layer comprises issuance of a host kernel system call at VMX Ring 0.

A further aspect provides a non-transitory computer-readable recording medium having instructions stored thereon. The instructions, when executed by one or more processors of a computing system having a host operating system and a guest operating system, cause the computing system to implement a virtualization mode method of operation. The method comprises: executing the host operating system on the computing system, the host operating system being associated with a set of hardware resources of the computing system; loading a guest process that is associated with the guest operating system; implementing a compatibility layer to handle all system calls from the guest process (guest syscalls), the compatibility layer supporting a virtualized subset of the hardware resources in which an interrupt controller is not emulated; upon the guest process issuing a guest syscall, the compatibility layer trapping the guest syscall; decoding, by the compatibility layer, the guest syscall according to one or more syscall conventions of the guest operating system; issuing, by the compatibility layer based on the decoding, a host system call (host syscall) to a host kernel or a hypervisor associated with the host operating system; and executing the host syscall issued by the compatibility layer.

BRIEF DESCRIPTION OF THE DRAWINGS

FIGS. 1A-C illustrates example computing devices which can be employed in accordance with aspects of the technology.

FIG. 2 illustrates a block diagram of an example computing device which can be employed in accordance with aspects of the technology.

FIG. 9 illustrates a method in accordance with aspects of the technology.

DETAILED DESCRIPTION

Overview

Figure 1B:
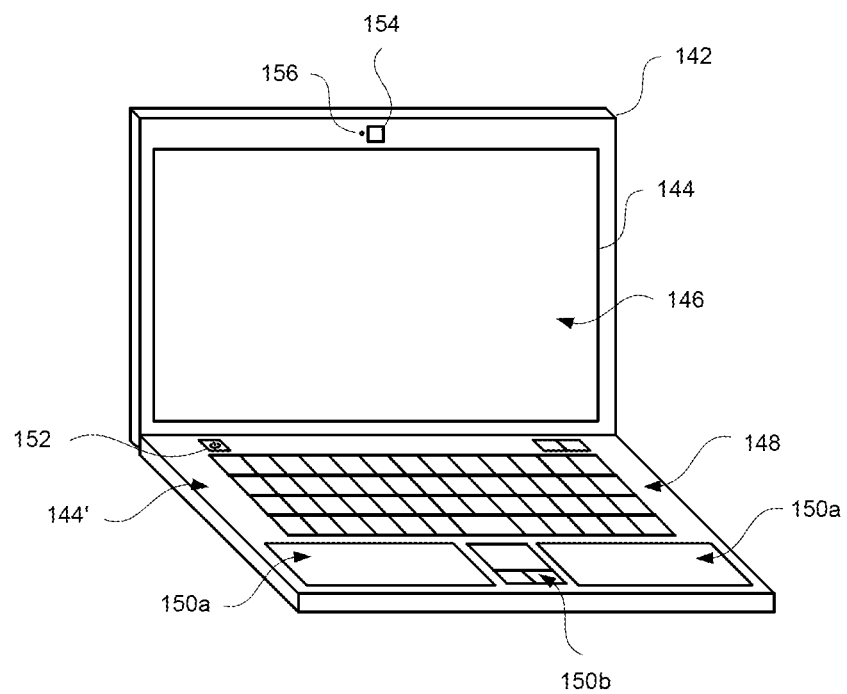

As discussed herein, a direct mode for virtualization in a computing device that supports simultaneous operation of different operating systems. A compatibility layer functions as a translator between instructions for the kernel of the operating system running on the hardware (a host operating system) and an operating system running in a virtual machine (a guest operating system). Two levels of scheduling are provided: host scheduling and guest scheduling. The architecture is able to employ a single layer of scheduling via the host scheduler, thereby providing more optimal scheduling for the code running within the guest. This approach enables the computing device to run unmodified applications for the guest operating system running in the virtual machine. Memory management involving such applications avoids unnecessary copy operations, for instance file write operations in which write operation parameters are mapped directly between one or more threads and virtual processors executing those threads. Another advantage to the approach is streamlining message passing. Furthermore, it can enable enhanced security between processes from different operating systems. The computing device may be a desktop computer, a laptop computer such as a netbook, an interactive home appliance or even a networked computing platform.

Example Computing Devices

FIG. 1A illustrates a view 100 of an example desktop-type computing device 102. In this example, a single display 104 is shown, although multiple display devices may be supported. In one scenario, the display 104 may be configured for tactile input using a stylus or touch input with the user's finger(s) to interact with a graphical user interface (GUI) 106 presented on the display. As shown, the computing device 102 may employ a wireless keyboard 108 and/or one or more trackpads or mousepads 110, which may be part of one unit or the keyboard may be separate from the trackpad/mousepad or a mouse-based input 110a. Alternatively, the keyboard and/or other user inputs may have a wired connection to the computing device 102. As shown in this example, the computing device has a stand 112. One or more microphones 114 may be disposed along the stand and/or disposed along the housing of the integrated client device 102. While the computing device may be fixedly mounted to the stand 112, in an alternative configuration the screen (with the integrated components) can be detached from the stand, allowing a user to carry around the home and use remotely based on battery power. In other words, the client device can comprise an integrated housing that is (optionally removably or releasably) coupled to the stand 112.

In this example, a webcam or other integrated camera 116 that may include a privacy shutter or other feature to disable image-taking is positioned along the housing of the computing device 102, which can be used for videoconferences, interactive gaming, etc. Indicator 118, such as an LED, may be illuminated to alert a user whenever the webcam 116 is in use. The integrated client device may include a separate camera or other imaging device 120 that is part of a presence sensor. As shown, the webcam 116 and the imaging device 120 may each be positioned along a top bezel of the integrated client device housing. In some examples these devices may be located in different position along the integrated housing. The integrated camera 116 may be used as part of the presence sensor instead of or in addition to imaging device 120. In other words, the presence sensor comprises an image sensor configured to take one or more images. The presence sensor can be configured to detect presence of one or more people within a threshold distance from the client computing device. For example, the presence sensor includes the image sensor, as discussed herein, and the client device is configured to detect the presence of one or more people in imagery (images) taken by the image sensor.

FIG. 1B illustrates view 140 of an example laptop computer 142, such as a netbook. In this example, a display 144 is shown. In one scenario, the display 144 may be configured for tactile input using a stylus or touch input with the user's finger(s) to interact with a graphical user interface (GUI) 146 presented on the display. As shown, the laptop 142 may employ a keyboard 148 and/or one or more trackpads 150a and/or mousepads 150b. These input devices 148 and 150 may be virtual input devices presented on a second display 144'. In this case, the laptop computer 142 may also function as a dual-screen device. One or more microphones 152 may be disposed along the housing of the computer 142. The laptop computer 142 may include a webcam or other integrated camera 154 that may include a privacy shutter or other feature to disable image-taking is positioned along the housing, which can be used for videoconferences, interactive gaming, etc. Indicator 156, such as an LED, may be illuminated to alert a user whenever the webcam 154 is in use. Similar to the computing device 102, the laptop computer 142 may include a separate camera or other imaging device, other than the webcam 154, that is part of a presence sensor.

Figure 1C:
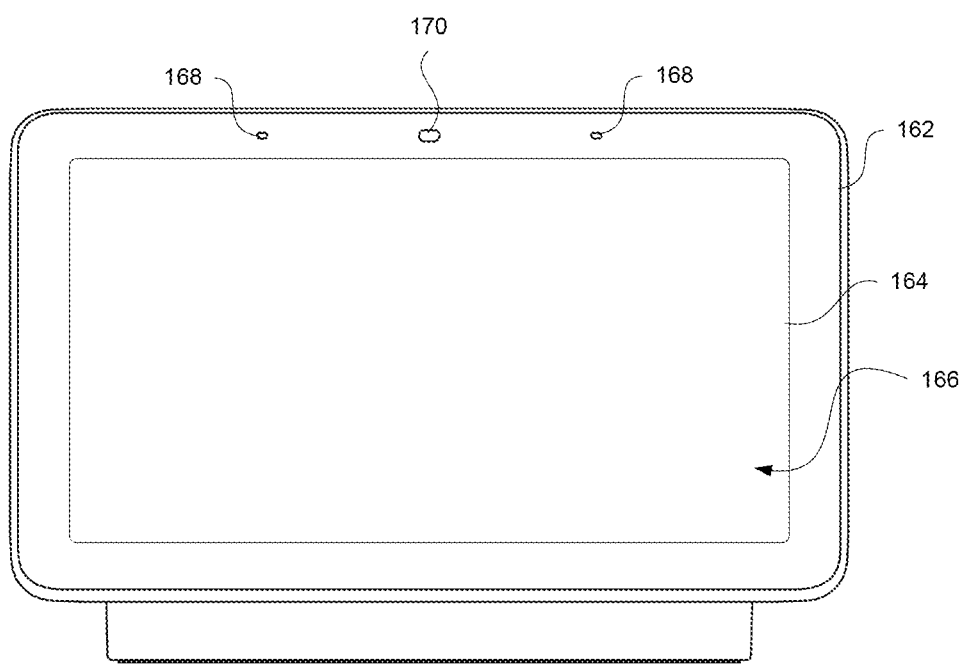

FIG. 1C illustrates view 160 of an example interactive home appliance 162. In this example, a display 164 is shown. In this example, the appliance 162 does not include a keyboard. In one scenario, the display 164 may be configured for tactile input using a stylus or touch input with the user's finger(s) to interact with a graphical user interface (GUI) 146 presented on the display. Alternatively or additionally to this, the interactive home appliance 162 may be configured to detect contactless gesture input, such as using a close range radar sensor (not shown), acoustical sensors (e.g., a microphone array) 168, cameras such as webcam 170, etc. In this arrangement, the camera(s) 170 may be part of a presence sensor.

FIG. 2 illustrates a block diagram 200 of an example computing device such as a desktop-type device, laptop-type device or interactive home appliance-type device discussed above. As shown, the computing device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 via the user interface module. The display module 216 has a display interface and may be configured as a touchscreen that enables user input via a stylus or other tool, or by the user physically touching the screen. Alternatively or additionally, contactless gesture input and/or audio input may be supported.

User interface module 214 is configured to receive user input. User interface module 214 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the computing device via a cable or other wired connection, or may physically separate from the integrated client device and configured to connect via one or more wireless connections such as Bluetooth™, WiFi, ultra-wideband (UWB), infrared, etc. The user interface module 214 can be operatively connected to the display module 216.

The display module 216 may comprise circuitry for driving the display device to present graphical and other information to the user. In other words, the display device is configured to present visual content. By way of example, the graphical information may be generated by the graphics processor(s) 206, while central processing unit (CPU) 204 manages overall operation of the computing device. The graphical information may display responses to user queries on the display module 216. For instance, the processing module may run a browser application, gaming application, enterprise app or other service using instructions and data stored in memory module 208, and present information associated w to the user via the display module 216. The memory module 208 may include a database or other storage for browser information, game state information, location information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively, the memory module 208 may also include removable media (e.g., DVD, CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 212 may be retrieved, stored or modified by the processors in accordance with the instructions 210. For instance, the data may be stored in computing device registers, in a relational database as a table having a plurality of different fields and records, XML documents or flat files. The data may also be formatted in any computing device-readable format. The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in example 200 of FIG. 2, the computing device includes a communication module 218 for communicating with other devices and systems, including other computing devices (e.g., a user's mobile phone or wearable computing device), servers and databases. The communication module 218 includes a wireless transceiver; alternatively, the module may alternatively or additionally include a wired transceiver. The integrated client device 200 may communicate with other remote devices via the communication module 218 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example device as shown includes one or more position and orientation sensors 220. The position and orientation sensors 220 are configured to determine the position and orientation of one or more parts of the computing device, such as the display module relative to the base. For example, these components may include a GPS receiver to estimate the integrated client device's latitude, longitude and/or altitude, as well as an accelerometer, gyroscope or another direction/speed detection device such as an inertial measurement unit (IMU) capable of determining the orientation of the display housing relative to the base (as well as the rate of change of the positioning of the display housing). The computing device may also include one or more camera(s) 222 for capturing still images and recording video streams such as an integrated webcam and/or a dedicated imaging device for presence sensing as discussed above. The device may also include one or more microphones 223 (which can be used for instruction input and/or presence sensing, e.g., by detecting acoustic information within the threshold distance from the client device), speakers 224, as well as a power module 226. Actuators to provide tactile feedback or other information to the user may be incorporated into the touchscreen of the display module (not shown).

In one scenario (as shown by the dashed lines in FIG. 2) the computing device may be configured to perform presence sensing of one or more people within a threshold distance. This may be done using an integrated dedicated camera, or, in some configurations the device may include a separate presence sensor module 228. As shown, this module includes an image sensor 230, a processing module 232 and a memory module 234. In one example, the image sensor can a dedicated low-resolution camera that may provide greyscale or color (e.g., RGB) imagery that has a size (in pixels) of 320×240, 300×300 or similar size (e.g., +/−20%). During operation, imagery may be taken by the image sensor 230 (or the webcam) once every 2-10 seconds (or more or less). The presence sensor module can be configured to implement one or more machine learning (ML) models to detect the presence of the one or more people in imagery taken by the image sensor 230. The processing module may comprise an FPGA or other processing device capable of processing imagery received from the image sensor in real time using one or more ML models. The models themselves can be stored in the memory module 234 or the main memory 208 of the device 200.

Figure 3:
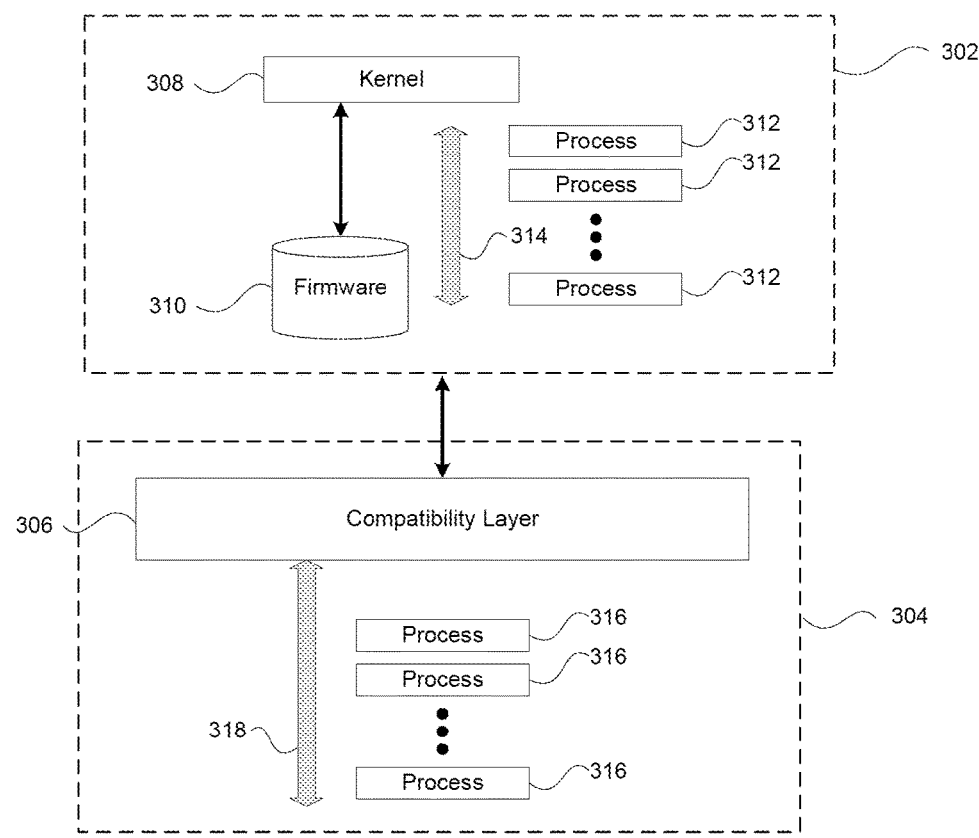
FIG. 3 illustrates a functional diagram of host and guest operating systems in accordance with aspects of the technology.

FIG. 3 illustrates an example 300 of a functional arrangement for a computing device that supports a direct mode for virtualization. As shown, a host operating system 302 is able to interact with a guest operating system 304 via a compatibility layer 306 (which is logically shown within the dashed box of the guest operating system 304). The host operating system 302 may logically include, as shown, a kernel 308, firmware 310 and one or more routines or other processes 312. The kernel 308 may communicate with the routines or other processes via a system bus 314, such as a d-bus, for inter-process communication (IPC). This typically occurs through system calls ("syscalls"). Here, the process calls into the kernel, and either gets an immediate response, or waits until the kernel responds to them, both of which occur by returning from the syscall. The guest operating system 304 may logically include, as shown, one or more routines or other processes 316 that the compatibility layer 306 interacts with via link 318. By way of example, the processes may include user-facing applications, device drivers, file systems, media codecs, network stacks, etc. For handling syscalls, the compatibility layer 306 effectively appears as a kernel to the guest operating system.

In particular, the compatibility layer 306 acts as the guest operating system kernel by receiving instructions that would usually be sent to the kernel (such as syscalls), and then translates those instructions for the host operating system kernel, thereby functioning a translator between the instructions for the guest operating system 304 and the instructions for the host operating system kernel 308. Here, the compatibility layer has direct access to the kernel 308 to enable direct calls. As discussed further below, the compatibility layer is configured to trap (intercept) guest OS syscalls and to pass them as needed to specific parts of the host operating system. This enables the system to effect hardware virtualization but with few limitations, since this approach does not create an entire virtual machine in which it would be necessary to implement all requirements to route interrupts to virtual CPUs, provide an interrupt controller, a clock, etc. Thus, the direct virtualization mode does not emulate many hardware resources that would otherwise be required for virtualization, such as an interrupt controller.

Example Arrangements

In certain types of computing systems that employ virtualization, a virtual CPU (vCPU), also known as a virtual processor, is a physical central processing unit (CPU) that is assigned to a virtual machine (VM). According to aspects of the technology, the host operating system employs a specialized microkernel (e.g., kernel 308 of FIG. 3), which is a type of kernel that includes only a minimum amount of code needed to function at the kernel mode. In contrast to a typical monolithic kernel, a microkernel differs in how it moves most components out of the kernel and places those components into user mode and a user space. Code running in the user space has limited operating system access and has limited direct interaction with the host kernel, which provides enhanced security. For example, the host (micro) kernel may only handle vital kernel functions like IPC and scheduling at the kernel mode, whereas all other functions are moved to the user space while in user mode. In comparison, a monolithic kernel would typically have nearly every function, regardless of its level of importance, at the kernel mode and few or none in the user mode.

The kernel that is used with the host operating system in accordance with aspects of the technology may be accompanied by a small set of user space services, drivers, and libraries (collectively, sources) necessary for the system to boot, communicate with to hardware, load user space processes and execute them, etc. The kernel here provides system calls ("syscalls") to manage various processes, threads, virtual memory, IPC, object state change waiting, locking functions, etc.

A scheduler is employed in conjunction with the kernel. The main function of the scheduler is to coordinate the management of processor time between any threads that need it. Generally, individual schedulers can run with each physical and virtual CPU in the computing device. Such schedulers may run independently and employ inter-processor interrupts (IPI) to coordinate resource usage. In this approach, each CPU (virtual or not) is responsible for scheduling any threads it is running.

The kernel manages various object types. For instance, user space code interacts with kernel objects with syscalls, for instance using handles. A handle in user space may be represented as an integer (e.g., a 32 bit integer). Here, when syscalls are executed, the kernel would check that a handle parameter (if used) references a handle that exists within the calling process's handle table. The kernel can also check to ensure that the handle is of a correct type, and that the required rights for the requested operation are associated with the handle.

A kernel process is a set of instructions that will be executed by one or more threads, along with a collection of resources associated with the thread(s). A process object is a container of different resources, such as handles, threads and virtual memory access regions (VMARs). Processes are owned by jobs, which enables an application that is composed of multiple processes to be treated as a single item from the perspective of resource and permission limits, as well as end-to-end control of the processes.

During operation, upon loading the client process, the compatibility layer registers to handle all the syscalls from a given client process from the guest operating system. Whenever the client process issues a syscall, control is transferred to the compatibility layer, which decodes the syscall according to guest operating system syscall conventions and does the work of the syscall. For example, for one syscall the compatibility layer may manipulate the address space of the client process using the appropriate operations to change the address of the program break of the client process. In one scenario, the compatibility layer is able to use host kernel exceptions to trap syscalls from the client process of the guest system. Thus, whenever the client process attempts to issue a syscall, the host kernel would reject the syscall because the host kernel requires syscalls to be issues from within the host kernel itself virtual Dynamic Shared Object (vDSO) (which the client process from the guest system is unaware exists).

A hardware-assisted, virtualization-based approach is implemented using a specialized compatibility layer, which enables the interception of guest syscalls, the setup of an application environment, and allows for direct invocation of host kernel system calls. This direct (virtualization) mode allows the compatibility layer to act directly as the guest operating system kernel, without needing to use host kernel exceptions. According to aspects of the technology, unmodified guest operating system applications are able to be run via the host operating system by providing a compatibility layer that translates guest operating system application binary interface-type (ABI) requests to the appropriate subsystem of the host operating system. To do this effectively, the compatibility layer intercepts guest operating system calls, and enables a runtime environment for a guest operating system application to operate within.

This approach involves the introduction of a direct mode of operation for virtualization. Using the ARM arrangement as an example, within the direct mode code can have complete access to its own exception levels (ELs), in particular EL1 and EL0 (such exception levels may also be provided in alternatives to the ARM arrangement). For the compatibility layer this means that in EL1 a compatibility layer will run, and in EL0, guest operating system applications will run. The compatibility layer will set up its environment, and will manage the page tables of guest applications it runs.

Within the direct mode approach, virtualization will only support a limited number of hardware features, effectively just enough of the hardware features for the compatibility layer to manage guest syscalls. Thus, an interrupt controller is not emulated, and attempts to access most system registers would fail. The benefit of this approach is that one can remove the limitations that are imposed by hardware emulation. By way of example, in an ARM hardware architecture, the system is not limited by having to emulate a virtual interrupt controller. Otherwise, depending on the version of the interrupt controller, the system could be prevented from launching more than 8 virtual CPUs. In an x86 hardware architecture, the system is limited by virtual processor IDs. Since the direct mode does not emulate a physical CPU, the system can recycle the processor IDs safely, and not affect hardware emulation or guest operating system state. In addition, the direct mode does not need to support interrupt injection into a guest, so the system does not need to handle queueing and injecting interrupts into individual virtual CPUs. The guest operating system does not have to have sophisticated interrupt handling and can simply leave that to the host operating system.

With such limitations removed, a guest operating system process is modeled as a guest object, and a guest operating system thread is modeled as a VCPU object. This means that the compatibility layer does not attempt to multiplex multiple threads onto a VCPU. It also means that within the host EL0, the compatibility layer is free to choose how to handle the guests. It can implement a compatibility layer (translator) per guest process structure, or it could manage a whole compatibility layer within a single host kernel process. When a guest is created with the direct mode approach, then all of its VCPUs must be created according to the direct mode too.

Figure 4A:
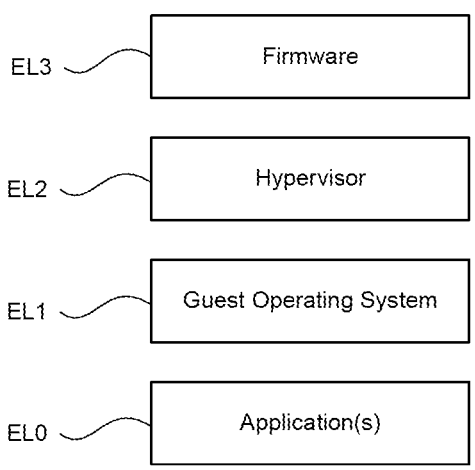
FIGS. 4A-B illustrate examples of exception levels and virtual address space for use with aspects of the technology.
Figure 4B:
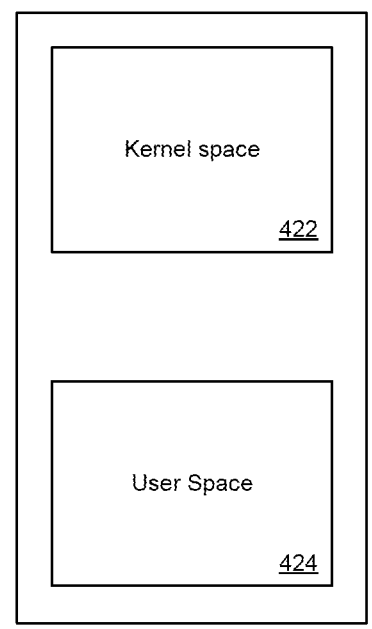

FIG. 4A illustrates an example 400 of the different exception levels (EL0-EL3) in an ARM architecture. As shown, EL0 contains apps maintained by the guest operating system. The guest operating system functions at EL1, while the hypervisor functions at EL2 and the firmware of the host operating system functions at EL3. FIG. 4B illustrates an example of virtual address space 400 for EL0 and EL1, showing that kernel space 422 is distinct from user space 424.

In accordance with aspect in one ARM-type ecosystem, in EL1 the compatibility layer is able to make host (kernel) syscalls using an "hvc" instruction. hvc is an ARM instruction, also known as "hypervisor call", which allows a guest operating system to call into the hypervisor. In EL0, the compatibility layer is able to run guest applications, and when they make guest (kernel) syscalls, the compatibility layer is able to trap the corresponding "svc" instruction. svc: is an ARM instruction, also known as "supervisor call", which allows user-space to call into a kernel. This is also referred to as a syscall. In direct mode, the system can use the hvc instruction to make syscalls from the guest operating system to the host operating system.

Figure 5A:
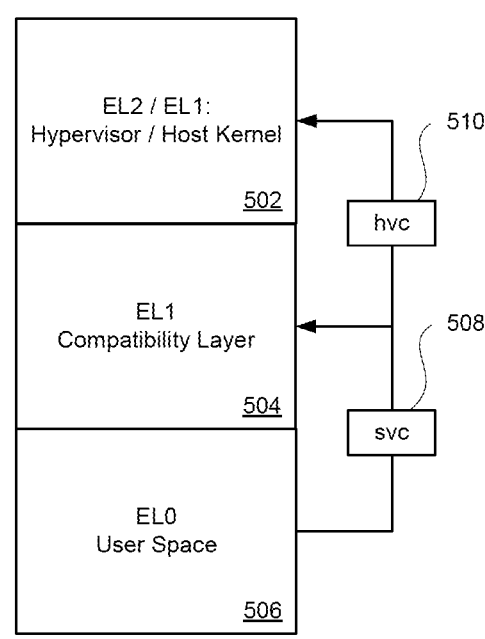
FIGS. 5A-B illustrate ARM-type direct mode virtualization examples in accordance with aspects of the technology.
Figure 5B:
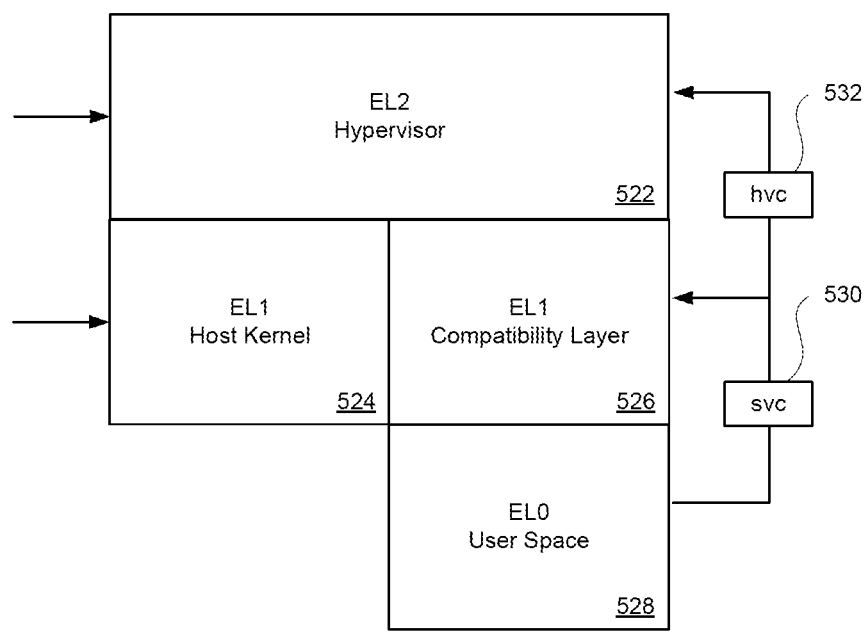

FIG. 5A illustrates one ARM-type example 500, showing the hypervisor and host kernel in EL2/EL1 in block 502, the compatibility layer in EL1 in block 504 and the user space in EL0 in block 506. FIG. 5B illustrates another ARM-type example 520, showing the hypervisor in EL2 in block 522, the host kernel in EL1 in block 524, the compatibility layer in EL1 block 526 and the user space in EL0 in block 528. FIGS. 5A-B illustrate the differences in how virtualization operates in two different versions of the ARM architecture. Specifically, 5A is ARM v8.1 or higher using virtual host extensions (VHE), and 5B is ARM v8. In these examples, in EL0, the compatibility layer is able to run guest applications, and when those applications make guest OS syscalls, the compatibility layer traps the corresponding svc instructions (508 or 530) at ELL In EL1, the compatibility layer is able to make host kernel syscalls using the hvc instruction (510 or 532).

Figure 5C:
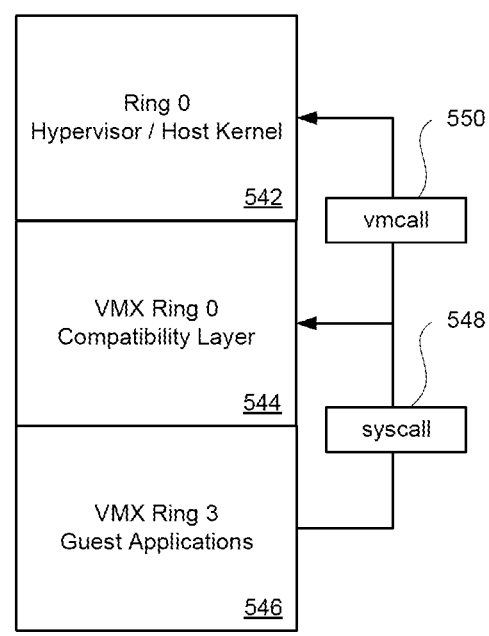
FIG. 5C illustrates an x86-type direct mode virtualization example in accordance with aspects of the technology.

In accordance with aspect in an x86-type ecosystem, in VMX Ring 0 the compatibility layer is able to make host (kernel) syscalls using a "vmcall" instruction. In VMX Ring 3, the compatibility layer is able to run guest applications, and when they make guest (kernel) syscalls, the compatibility layer is able to trap the corresponding "syscall" instruction. FIG. 5C illustrates one x86-type example 540, showing the hypervisor and host kernel in Ring 0 in block 542, the compatibility layer in VMX Ring 0 in block 544 and the guest applications in VMX Ring 3 in block 546. When the guest applications make syscalls, the compatibility layer traps the corresponding syscall instructions 548 from VMX Ring 3. In VMX Ring 0, the compatibility layer is able to make host kernel syscalls using the vmcall instruction 550. The following discussion uses ARM-related terminology, but the approach applies equally to an x86 approach unless expressly stated.

Hypervisor

Within the hypervisor, when direct mode is enabled, the class Guest is modified to remove the limit on the virtual-processor identifier (VPID) allocator. This limit would otherwise prevent the system from creating an unbound number of virtual processors (e.g., VCPUs) per guest. With the limit removed, any number of virtual processors can be assigned as warranted to perform selected operations, thereby streamlining the process and reducing delays/overall compute time. In addition, the system is able to create a 1:1 mapping between guest threads and corresponding virtual processors for the direct mode approach, so the compatibility layer does not need to multiplex threads onto VCPUs. This mapping between tasks of the guest process and multiple virtual processors allows the compatibility layer to take advantage of the fact that a virtual processor must correspond to a host kernel thread, and is therefore scheduled directly by the host kernel while executing. The direct scheduling provides streamlined, efficient processing by the virtual processors.

Next, when direct mode is enabled, the system can remove all unnecessary hardware emulation from a VCPU. This includes the removal of interrupt controller emulation, para-virtual clock emulation, saving and restoring of system registers or handling of system instructions that are only required for full operating system support. This means that even various functions including timers will be handled by the host operating system, and so the VCPU logic can be streamlined. For instance, software that builds on direct mode would not need to emulate basic devices such as a peripheral component interconnect (PCI) bus, a universal asynchronous receiver-transmitter (UART), a real-time clock (RTC), or advanced devices such as storage devices, network devices, or graphics devices.

VDSO

To support the ability of the compatibility layer to make syscalls from guest ELL a virtual Dynamic Shared Object (VDSO) is created that can be mapped into guest EL1 for the compatibility layer. The VDSO is an Executable and Linkable Format (ELF) file containing the user-space implementation of each syscall. ELF is a preexisting file format for executable files, object code, shared libraries, and core dumps. The direct mode VDSO differs from other virtualization approaches, which do not provide VDSO, in that it will use hvc instructions to make the syscall, rather than svc instructions. Thus, to handle a syscall, the hypervisor will trap hvc invocations, validate that the guest instruction pointer is from within the VDSO, and validate that the call was made from guest EL1. If the syscall is valid, it will then unpack the arguments and make the appropriate function call within the kernel. This entire process is synchronous.
Guest EL1

When a compatibility layer runs within guest ELL it is required to set up some similar state to that of an operating system. This means that compatibility layer must set up both (1) the appropriate syscall handlers for the architecture in order to handle guest syscalls and (2) the page tables for guest EL1 and guest EL0, for both itself and the guest application respectively. Or to describe it another way, when operating in ELL a compatibility layer must conform to the expectations of software running in EL'. However, a compatibility layer is not required to handle interrupts, as all external interrupts will be routed to the host kernel.

As the compatibility layer is able to make host kernel syscalls, when additional threads are required, either for the compatibility layer or a guest application, the compatibility layer can spawn new host kernel threads and create a new VCPU on that thread. It does not require a context switch to the host kernel EL0. To return to host kernel EL0, compatibility layer can set a synchronous memory trap. Once in host kernel EL0, the compatibility layer can readily manage the host operating system process associated with the guest operating system. By way of example, to support 32-bit Linux applications, the compatibility layer would set up the appropriate syscall handling within guest ELL and would perform the architecture-specific handling of 32-bit state.
Structure of the Compatibility Layer Given the primitives provided by virtualization in the direct mode, there are several potential structures that the compatibility layer may adopt. These include: one compatibility layer per guest process, one compatibility layer per host kernel process, and a shared compatibility layer structure. All of these structures share two things in common. One is that a VCPU corresponds to a guest thread. Here, there is a 1:1:1 mapping between a host kernel thread, a VCPU, and a guest thread, meaning that a guest thread is directly scheduled by the host kernel. The other commonality is that a guest corresponds to a compatibility layer. There is a 1:1 mapping between a guest and an instance of a compatibility layer running in EL'.

Figure 6A:
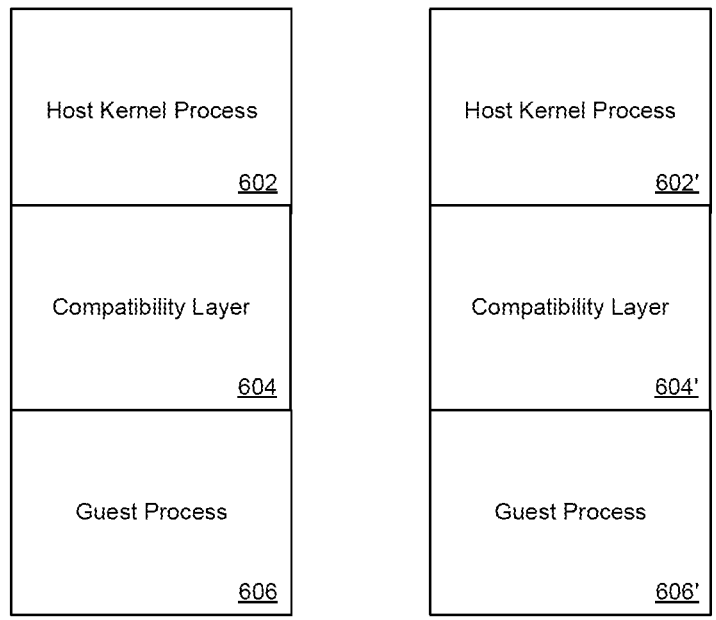
FIGS. 6A-C illustrate compatibility layer aspects in accordance with aspects of the technology.

FIG. 6A illustrates an example 600 showing that there is one compatibility layer per guest process. Here, on the left side, there is a host kernel process 602, a compatibility layer 604 and a guest process 606, while on the right side there is a host kernel process 602', a compatibility layer 604' and a guest process 606'. This shows that there is a 1:1:1 mapping between one host kernel process, a compatibility layer, and a guest process. This means that from the host kernel, there is visibility into the guest processes being run by the compatibility layer.

Figure 6B:
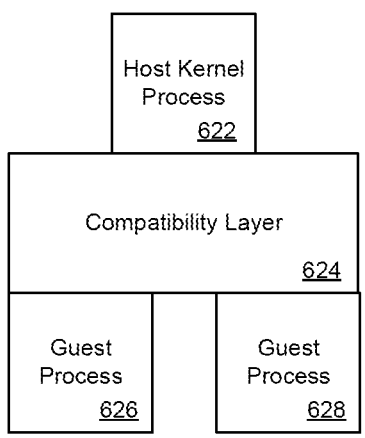

FIG. 6B illustrates an example 620, which shows a single host kernel process 622, a compatibility layer 624, and a pair of guest processes 626 and 628. This shows that there is a 1:1 mapping between a compatibility layer and a host kernel process, but that a single compatibility layer may contain multiple guest processes. This allows a whole compatibility layer to be managed by a single host kernel process, and avoids the need for shared handle tables or shared futexes.

Figure 6C:
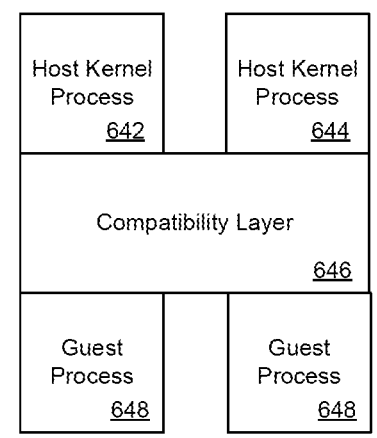

FIG. 6C illustrates an example 640, which shows a pair of host kernel process 642 and 644, a compatibility layer 646, and a pair of guest processes 648 and 650. Here, this shows that there is a 1:1 mapping between a host kernel process and a guest process (e.g., 642 and 648, or 644 and 650), but a compatibility layer shares a single compatibility layer 646. This allows the compatibility layer to share common state between all the guest processes in a compatibility layer, while still providing process separation.
Performance Using virtualization in a computing system is not a zero-cost approach. While executing within the guest, the primary operating cost comes from page-table overhead, both due to the additional allocation of page-tables to support the guest physical address space, as well as the additional page-table traversal required. Depending on the hardware, the cost of the additional page-table traversal may be trivial or it may not. To fully quantify the cost of the guest physical address space, it is helpful to measure it.

Figure 7:
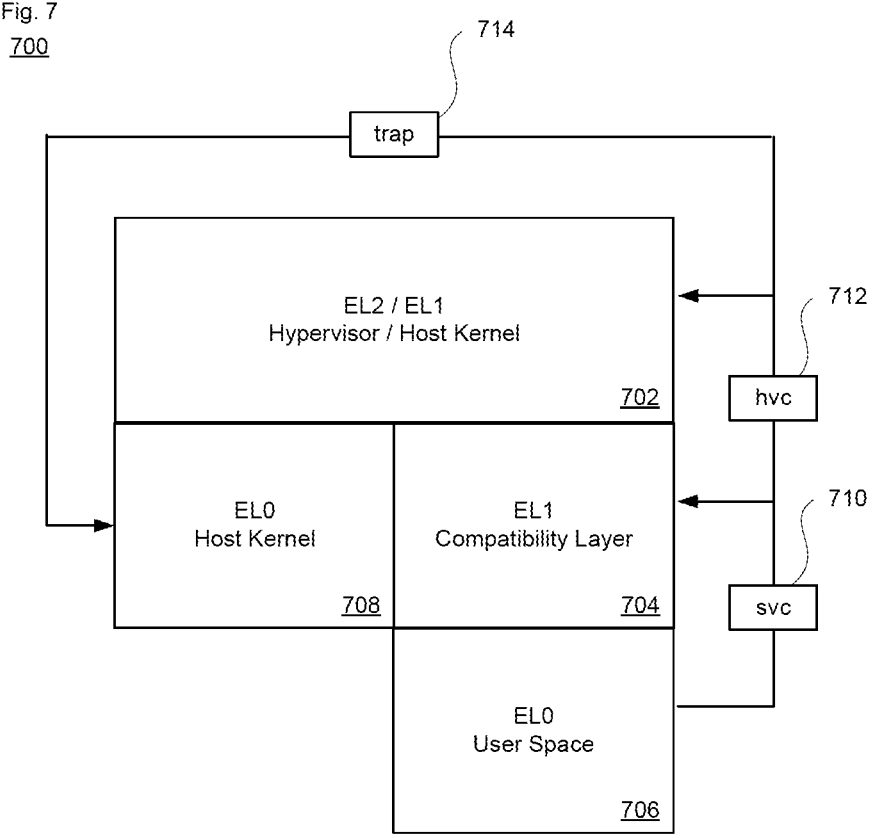
FIG. 7 illustrates a cost evaluation in accordance with aspects of the technology.

An example 700 for an evaluation is shown in FIG. 7. Here, the hypervisor and host kernel are located in EL2/EL1 in block 702, the compatibility layer is in EL1 in block 704 and the user space in EL0 in block 706. As shown, there is also host kernel functionality associated with EL0 in block 708. As noted above with regard to FIGS. 5A-B, in EL0, the compatibility layer is able to run guest applications, and when those applications make guest OS syscalls, the compatibility layer traps the corresponding svc instructions 710 at EL1. In EL1, the compatibility layer is able to make host kernel syscalls using the hvc instruction 712.

There are three levels of context switch that can occur, with increasing degrees of cost. Going from a guest application to a compatibility layer will cost as much as a regular syscall (e.g., compute time cost). Going from a compatibility layer to EL1 will cost more than a regular syscall, but will be comparable, with the cost varying by architecture (e.g., ARM type or x86 type). Going from a guest application or compatibility layer via trap 714 to host kernel EL0 will cost substantially more. When deciding on the structure of the compatibility layer to implement, these different context switching costs should be considered. If the full transition to host kernel EL0 can be minimized, the rest of the context switching costs are comparable to that of a regular syscall.

Figure 8A:
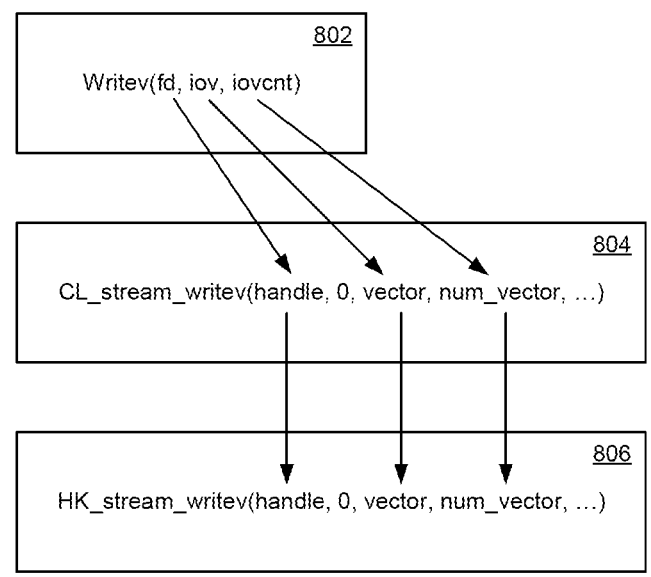
FIG. 8A illustrates an example of a file write process in accordance with aspects of the technology.

FIG. 8A illustrates an example 800 of a file write operation according to a direct mode implementation, in which there are zero additional copy operations. Here, a write operation initiated by the guest process at block 802 is trapped by the compatibility layer and transformed at block 804. In particular, "fd" is translated to a handle, the address "iov" is translated to a vector, and "iovcnt" is translated to "num_vector". fd is a file descriptor, which in UNIX is an integer representing access to a file. iov is an IO vector, which is an array of structures, where each structure represents an offset and length of what to write into the file descriptor. Iovcnt is an IO vector count—the size of the array of structures. And num_vector is a number of vectors—the size of the array of structures.

Here, when interacting with the host kernel, the handle, vector and num_vector are mapped directly, which results in zero additional copy operations. The transformation of addresses may depend on mapping choices. For instance, the direct mode may employ a simple 1:1 mapping, and then split up the address space for EL0. In another approach, page tables could be traversed and the compatibility layer could build a new vector. Or the compatibility layer could build the address spaces in a way that could be shared with the host kernel.

Figure 8B:
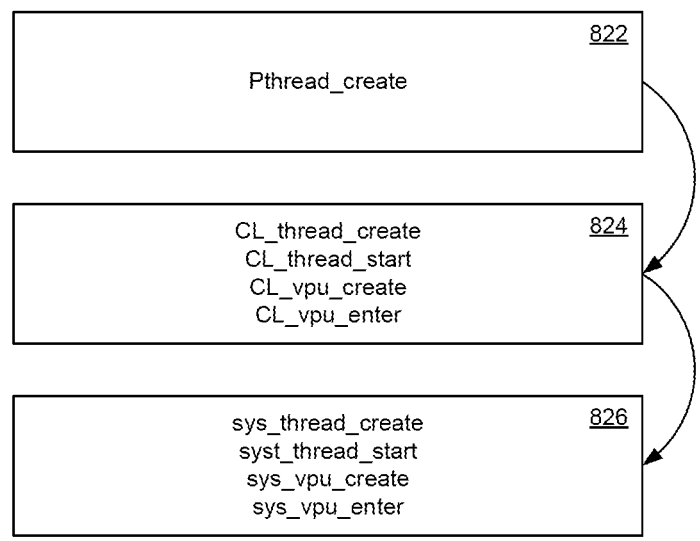
FIG. 8B illustrates an example of thread creation in accordance with aspects of the technology.

FIG. 8B illustrates an example of thread creation according to a direct mode implementation. To create a thread in the guest (Pthread_create): the system starts a thread in the host kernel, and enters a VCPU on that thread. Here, entering the VCPU makes the thread accessible to the compatibility layer. pthread_create (or equivalent function) is trapped by the compatibility layer, which then kicks off all the subsequent syscalls.

Other Considerations

In accordance with one aspect of the above-described direct mode virtualization approach, if the system supports other virtualization types that implement all requirements to route interrupts to virtual CPUs, provide an interrupt controller, a clock, etc., then those other types should not be permitted to access host kernel syscalls. Furthermore, the direct mode needs to be able to exist simultaneously with other supported virtualization type. Here, the architecture should ensure that it does not save and restore the wrong state for the wrong mode of operation, which could lead to invalid operation or kernel state disclosure.

Technical solutions and benefits to direct mode virtualization include avoiding the need to create an entire virtual machine in which it would be necessary to implement all requirements to route interrupts to virtual CPUs, provide an interrupt controller, a clock, etc. The direct virtualization mode described herein does not emulate many hardware resources that would otherwise be required for virtualization, such as an interrupt controller; instead, it supports a minimum amount of hardware resources that are needed for the compatibility layer to manage the syscalls from the guest operating system. The technology is robust in that can be employed with different hardware architectures, such as x86 and ARM architectures. Another technical benefit is efficiency regarding the compute time cost of operations such as a file write operation, in which zero additional copy operations are needed to implement in the direct mode.

Exemplary Method of Operation

FIG. 9 illustrates a method 900 for implementing a virtualization mode on a computing system having a host operating system and a guest operating system. The method includes, at block 902, executing the host operating system on the computing system, where the host operating system is associated with a set of hardware resources of the computing system. At block 904 the method includes loading a guest process that is associated with the guest operating system. Here, the guest process will be implemented according to a direct virtualization mode. At block 906, the method includes implementing a compatibility layer to handle all system calls from the guest process (guest syscalls), in which the compatibility layer supports a virtualized subset of the hardware resources in which one or more hardware resources of the set are not emulated. At block 908, upon the guest process issuing a guest syscall, the compatibility layer traps the guest syscall. At block 910 the method includes decoding, by the compatibility layer, the guest syscall according to one or more syscall conventions of the guest operating system. At block 912 the method includes issuing, by the compatibility layer based on the decoding, a host system call (host syscall) to a host kernel or a hypervisor associated with the host operating system. And at block 914 the host syscall issued by the compatibility layer is executed.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for implementing a virtualization mode on a computing system having a host operating system and a guest operating system, the method comprising:
   executing the host operating system on the computing system, the host operating system being associated with a set of hardware resources of the computing system;
   loading a guest process that is associated with the guest operating system;
   implementing a compatibility layer to handle all system calls from the guest process (guest syscalls), the compatibility layer supporting a virtualized subset of the set of hardware resources in which one or more hardware resources of the set are not emulated;
   creating a virtual dynamic shared object (VDSO) for mapping into a guest exception level for the compatibility layer;
   upon the guest process issuing a guest syscall, the compatibility layer trapping the guest syscall;
   decoding, by the compatibility layer, the guest syscall according to one or more syscall conventions of the guest operating system;
   issuing, by the compatibility layer based on the decoding, a host system call (host syscall) to a host kernel or a hypervisor associated with the host operating system; and
   executing the host syscall issued by the compatibility layer.

2. The method of claim 1, further comprising manipulating, by the compatibility layer, address space of the guest process to change an address of a program break of the guest process.

3. The method of claim 1, further comprising modifying a parameter of the guest process to enable any number of virtual processors with the virtualization mode.

4. The method of claim 1, wherein implementing the compatibility layer includes creating a direct mapping between tasks of the guest process and a set of virtual processors.

5. The method of claim 1, wherein the virtualized subset of the hardware resources does not include at least one of: interrupt controller emulation, para-virtual clock emulation, saving and restoring of system registers, or handling of system instructions that are only required for full operating system support.

6. The method of claim 1, wherein any timers associated with the guest process are handled by the host operating system.

7. The method of claim 1, wherein:
   the computing system has an ARM-based architecture;
   the guest process issues the guest syscall at exception level 0 (EL0);
   trapping the guest syscall by the compatibility layer occurs at exception level 1 (EL1); and
   issuing the host syscall by the compatibility layer comprises issuing a hypervisor call to the hypervisor.

8. The method of claim 7, wherein executing the host syscall issued by the compatibility layer includes:
   trapping, by the hypervisor, the hypervisor call;
   validating that a guest instruction pointer is from within the VDSO; and
   validating that the hypervisor call was made from a guest exception layer.

9. The method of claim 8, further comprising, upon validating that the hypervisor call was made from the guest exception layer, the hypervisor making function calls associated with the hypervisor call within the host kernel.

10. The method of claim 1, wherein:
the computing system has an x86-based architecture;
the guest process issues the guest syscall at virtual machine extension (VMX) Ring 3;
trapping the guest syscall by the compatibility layer occurs at VMX Ring 0; and
issuing the host syscall by the compatibility layer comprises issuing a host kernel system call at VMX Ring 0.

11. The method of claim 1, wherein the virtualization mode does not support interrupt injection into the guest process.

12. The method of claim 1, wherein the guest process corresponds to a memory management operation.

13. The method of claim 12, wherein the memory management operation includes a file write operation in which parameters associated with the file write operation are mapped directly.

14. A computing system having a host operating system and supporting a guest operating system in a virtualization mode, the computing system comprising:
a processing module having one or more hardware processors;
memory include a kernel space and a user space, the memory storing the guest operating system in the user space;
wherein the processing module is configured to implement the virtualization mode by:
execution of the host operating system, the host operating system being associated with a set of hardware resources of the computing system;
load a guest process that is associated with the guest operating system;
implement a compatibility layer to handle all system calls from the guest process (guest syscalls), the compatibility layer supporting a virtualized subset of the set of hardware resources in which one or more hardware resources of the set are not emulated;
create a virtual dynamic shared object (VDSO) for mapping into a guest exception level for the compatibility layer;
upon the guest process issuing a guest syscall, having the compatibility layer trap the guest syscall;
decode, by the compatibility layer, the guest syscall according to one or more syscall conventions of the guest operating system;
issue, by the compatibility layer based on the decoding, a host system call (host syscall) to a host kernel or a hypervisor associated with the host operating system; and
execute the host syscall issued by the compatibility layer.

15. The computing system of claim 14, wherein the compatibility layer is further configured to manipulate address space of the guest process to change an address of a program break of the guest process.

16. The computing system of claim 14, wherein implementation of the compatibility layer includes creating a 1:1 mapping between guest threads and virtual central processing units (VCPUs).

17. The computing system of claim 14, wherein the one or more hardware resources of the set that are not emulated includes at least one of a peripheral component interconnect bus, a universal asynchronous receiver-transmitter, a real-time clock, a storage device, a network device, or a graphics device.

18. The computing system of claim 14, wherein:
the computing system has an ARM-based architecture;
the guest process issues the guest syscall at exception level 0 (EL0);
the guest syscall is trapped by the compatibility layer at exception level 1 (EL1); and
issuance of the host syscall by the compatibility layer comprises issuance of a hypervisor call to the hypervisor.

19. The computing system of claim 18, wherein execution of the host syscall issued by the compatibility layer includes:
trapping, by the hypervisor, of the hypervisor call;
validation that a guest instruction pointer is from within the VDSO;
validation that the hypervisor call was made from a guest exception level; and
upon validation that the hypervisor call was made from the guest exception level, the hypervisor makes function calls associated with the hypervisor call within the host kernel.

20. The computing system of claim 14, wherein:
the computing system has an x86-based architecture;
the guest process issues the guest syscall at virtual machine extension (VMX) Ring 3;
the guest syscall is trapped by the compatibility layer at VMX Ring 0; and
issuance of the host syscall by the compatibility layer comprises issuance of a host kernel system call at VMX Ring 0.

21. A non-transitory computer-readable recording medium having instructions stored thereon, the instructions, when executed by one or more processors of a computing system having a host operating system and a guest operating system, cause the computing system to implement a virtualization mode method of operation, the method comprising:
executing the host operating system on the computing system, the host operating system being associated with a set of hardware resources of the computing system;
loading a guest process that is associated with the guest operating system;
implementing a compatibility layer to handle all system calls from the guest process (guest syscalls), the compatibility layer supporting a virtualized subset of the set of hardware resources in which an interrupt controller is not emulated;
creating a virtual dynamic shared object (VDSO) for mapping into a guest exception level for the compatibility layer;
upon the guest process issuing a guest syscall, the compatibility layer trapping the guest syscall;
decoding, by the compatibility layer, the guest syscall according to one or more syscall conventions of the guest operating system;
issuing, by the compatibility layer based on the decoding, a host system call (host syscall) to a host kernel or a hypervisor associated with the host operating system; and
executing the host syscall issued by the compatibility layer.

22. A computing system having a host operating system and supporting a guest operating system in a virtualization mode, the computing system comprising:
a processing module having one or more hardware processors;

memory include a kernel space and a user space, the memory storing the guest operating system in the user space;

wherein the processing module is configured to implement the virtualization mode by:
- execution of the host operating system, the host operating system being associated with a set of hardware resources of the computing system;
- load a guest process that is associated with the guest operating system;
- implement a compatibility layer to handle all system calls from the guest process (guest syscalls), the compatibility layer supporting a virtualized subset of the set of hardware resources in which one or more hardware resources of the set are not emulated;
- upon the guest process issuing a guest syscall, having the compatibility layer trap the guest syscall;
- decode, by the compatibility layer, the guest syscall according to one or more syscall conventions of the guest operating system;
- issue, by the compatibility layer based on the decoding, a host system call (host syscall) to a host kernel or a hypervisor associated with the host operating system;
- execute the host syscall issued by the compatibility layer; and
- modify a guest class to remove any limit on a virtual-processor identifier (VPID) allocator.

23. The method of claim 1, wherein the one or more hardware resources of the set that are not emulated include an interrupt controller.

24. The method of claim 1, wherein the one or more hardware resources of the set that are not emulated include at least one of a peripheral component interconnect (PCI) bus, a universal asynchronous receiver-transmitter (UART), a real-time clock (RTC), a storage device, a network device or a graphics device.

* * * * *